(12) United States Patent
Hare et al.

(10) Patent No.: US 12,496,316 B2
(45) Date of Patent: Dec. 16, 2025

(54) TREATMENT OF SEXUAL DYSFUNCTION AND IMPROVEMENT IN SEXUAL QUALITY OF LIFE

(71) Applicant: LONGEVERON INC., Miami, FL (US)

(72) Inventors: Joshua M. Hare, Miami, FL (US); Darcy L. DiFede, Miami, FL (US)

(73) Assignee: Longeveron Inc., Miami, FL (US)

( * ) Notice: Subject to any disclaimer, the term of this patent is extended or adjusted under 35 U.S.C. 154(b) by 160 days.

(21) Appl. No.: 16/624,118

(22) PCT Filed: Jun. 15, 2018

(86) PCT No.: PCT/US2018/037725
§ 371 (c)(1),
(2) Date: Dec. 18, 2019

(87) PCT Pub. No.: WO2018/236680
PCT Pub. Date: Dec. 27, 2018

(65) Prior Publication Data
US 2020/0129558 A1 Apr. 30, 2020

Related U.S. Application Data

(60) Provisional application No. 62/521,765, filed on Jun. 19, 2017.

(51) Int. Cl.
*A61K 35/28* (2015.01)
*A61K 35/545* (2015.01)
*A61P 15/00* (2006.01)

(52) U.S. Cl.
CPC ............ *A61K 35/28* (2013.01); *A61K 35/545* (2013.01); *A61P 15/00* (2018.01)

(58) Field of Classification Search
CPC ........ A61K 35/28; A61K 35/545; A61P 15/00
See application file for complete search history.

(56) References Cited

U.S. PATENT DOCUMENTS

| | | | |
|---|---|---|---|
| 6,107,331 A | 8/2000 | MacLean et al. | |
| 2009/0311223 A1* | 12/2009 | Ichim | A61K 35/36 514/1.1 |
| 2010/0040586 A1* | 2/2010 | Silva | A61K 35/28 424/93.7 |
| 2012/0244130 A1 | 9/2012 | Yamamoto et al. | |

FOREIGN PATENT DOCUMENTS

| | | | | |
|---|---|---|---|---|
| CN | 105055450 A | 11/2015 | | |
| JP | H10-007563 A | 1/1998 | | |
| WO | WO-2013173694 A2 * | 11/2013 | ............. | A61P 13/00 |
| WO | 2015184427 A1 | 12/2015 | | |

OTHER PUBLICATIONS

Mazini et al. "Hopes and limits of adipose-derived stem cells (ADSCs) and mesenchymal stem cells (MSCs) in wound healing." International Journal of Molecular Sciences 21.4 (2020): 1306. (Year: 2020).*

Mehling et al. "Evaluation of Immune response to Intravenously Administered Human Cord Blood Stem Cells in the Treatment of Symptoms Related to Chronic Inflammation." Journal of Stem Cell Research & Therapy 5.297 (2015): 2. (Year: 2015).*

Kundrotas "Surface markers distinguishing mesenchymal stem cells from fibroblasts." Acta Medica Lituanica 19.2 (2012): 75-79. (Year: 2012).*

Mafi et al. "Suppl 2: Adult Mesenchymal Stem Cells and Cell Surface Characterization—A Systematic Review of the Literature." The Open Orthopaedics Journal 5 (2011): 253. (Year: 2011).*

Camacho et al. "Sexual dysfunction in the elderly: age or disease ?." International Journal of Impotence Research 17.1 (2005): S52-S56. (Year: 2005).*

Bivalacqua et al., "Mesenchymal Stem Cells Alone or Ex Vivo Gene Modified with Endothelial Nitric Oxide Synthase Reverse Age-Associated Erectile Dysfunction," American Journal of Physiology: Heart and Circulatory Physio, American Physiological Society, US, (Oct. 26, 2006), vol. 292, No. 3. pp. H1278-H1290.

Mangir et al., "Mesenchymal Stem Cell Therapy in Treatment of Erectile Dysfunction: Autologous or Allogeneic Cell Sources?," International Journal of Urology, Official Journal of the Japanese Urological Association, (Dec. 2014), vol. 21, No. 12, pp. 1280-1285.

Quirici et al., "Isolation of Bone Marrow Mesenchymal Stem Cells by Anti-Nerve Growth Factor Receptor Antibodies," Experimental Hematology, Elsevier Inc, US, (Jan. 1, 2002), vol. 30, No. 7, pp. 783-791.

Seftel, "Re: Combination of Mesenchymal Stem Cell Injection with Icariin for the Treatment of Diabetes-Associated Erectile Dysfunction," Journal of Urology, (Jan. 1, 2016), vol. 198, No. 2, pp. 238.

Wang et al., "Hypoxia Precondition Promotes Adipose-Derived Mesenchymal Stem Cells Based Repair of Diabetic Erectile Dysfunction via Augmenting Angiogenesis and Neuroprotection," Plos One, (Mar. 19, 2015), vol. 10, No. 3, pp. e118951-1, (18 pages).

Notification of Transmittal of the International Search Report (Form PCT/ISA/220 and PCT/ISA/210) and the Written Opinion of the International Searching Authority (Form PCT/ISA/237) issued on Sep. 25, 2018, by the European Patent Office in corresponding International Application No. PCT/US2018/037725. (17 pages).

Written Opinion issued Jun. 7, 2021, by the Intellectual Property Office of Singapore in corresponding Singapore Patent Application No. 11201912209U. (6 pages).

Al-Nbaheen et al., "Human Stromal (Mesenchymal) Stem Cells from Bone Marrow, Adipose Tissue and Skin Exhibit Differences in Molecular Phenotype and Differentiation Potential", Stem Cell Rev and Rep, Springer, 2013(Published online Apr. 14, 2012), vol. 9, No. 1, pp. 32-43.

(Continued)

*Primary Examiner* — Emily A Cordas
(74) *Attorney, Agent, or Firm* — Buchanan Ingersoll & Rooney PC

(57) ABSTRACT

Compositions and methods for treating sexual dysfunction and enhancing sexual satisfaction using isolated populations of mesenchymal stem cells are disclosed.

13 Claims, 2 Drawing Sheets

(56) References Cited

OTHER PUBLICATIONS

Figure 1:
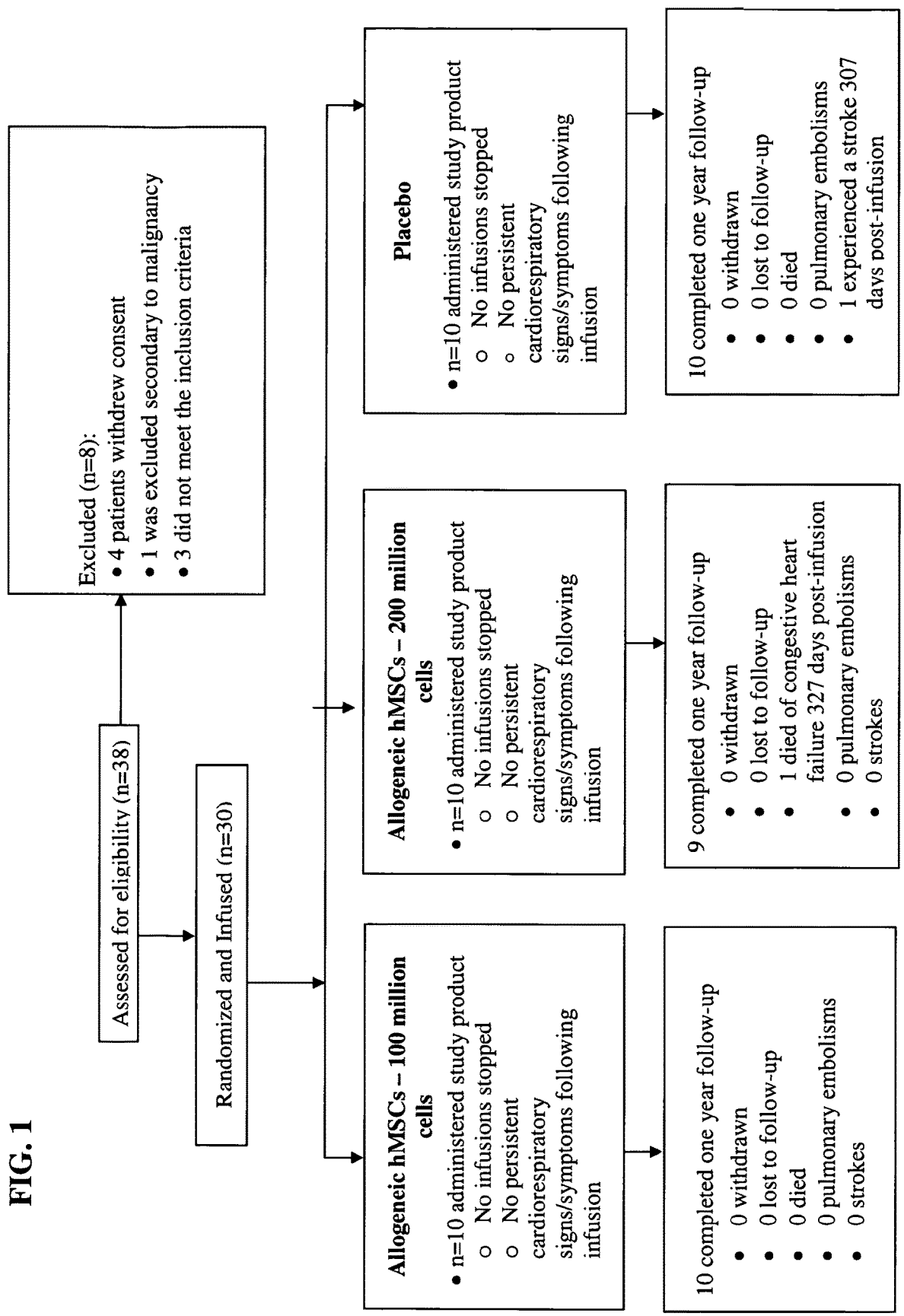

Gelfand, "Sexuality Among Older Women", Journal of Women's Health & Gender-Based Medicine, (Jul. 7, 2004), vol. 9, No. Supplement 1, https://doi.org/10.1089/152460900318812. (2 pages).

Golpanian et al., "Allogeneic Human Mesenchymal Stem Cell Infusions for Aging Frailty", Journal of Gerontology: Medical Science, (Apr. 21, 2017), vol. 72, No. 11, pp. 1505-1512.

Morley et al., "Androgens and Women at the Menopause and Beyond", Journal of Gerontology: Medical Sciences, (2003), vol. 58A, No. 5, pp. 409-416.

Office Action (Notice of Reasons for Rejection) issued Jul. 12, 2022, by the Japan Patent Office in corresponding Japanese Patent Application No. 2020-519007 and an English Translation of the Office Action. (10 pages).

Office Action issued Sep. 28, 2022, by the Taiwan Patent Office in corresponding Taiwanese Patent Application No. 107120931. (5 pages).

Office Action (Notice of Deficiencies) issued Nov. 9, 2022, by the Israel Patent Office in corresponding Israeli Patent Application No. 271395. (4 pages).

Second Written Opinion issued Nov. 23, 2022, by the Intellectual Property Office of Singapore in corresponding Singapore Patent Application No. 11201912209U. (6 pages).

Office Action (Notice of Reasons for Rejection) issued Jan. 10, 2023, by the Japan Patent Office in corresponding Japanese Patent Application No. 2020-519007 and an English Translation of the Office Action. (6 pages).

Office Action (Notification of the Second Office Action) issued on Sep. 27, 2023, by the China National Intellectual Property Administration in corresponding Chinese Patent Application No. 2018800468234, and an English Translation of the Office Action. (12 pages).

Hoang, et al. "Adipose-derived mesenchymal stem cell therapy for the management of female sexual dysfunction: Literature reviews and study design of a clinical trial" Frontiers in Cell and Developmental Biology (2022), pp. 1-18.

Office Action (First Office Action) issued Feb. 28, 2023, by the National Intellectual Property Administration, P. R. China in corresponding Chinese Patent Application No. 201880046823.4 and an English translation of the Office Action. (12 pages).

\* cited by examiner

TREATMENT OF SEXUAL DYSFUNCTION AND IMPROVEMENT IN SEXUAL QUALITY OF LIFE

FIELD OF THE INVENTION

The present invention relates to methods of treating sexual dysfunction, particularly female sexual dysfunction, and related disorders and conditions pertaining to sexual activity and sexual satisfaction, and methods to enhance sexual satisfaction, particularly female sexual satisfaction by administering therapeutically effective amounts of isolated populations of mesenchymal stem cells.

BACKGROUND OF THE INVENTION

Female sexual dysfunction (FSD) is a prevalent problem, afflicting approximately 40% of women. There are few treatment options. K. H. et al., *Cardiovasc Hematol Agents Med Chem.* 7(4): 260-269 (2009). FSD can be classified under many subtypes. For example, female sexual arousal disorder (FSAD) is a disorder characterized by a persistent inability to attain sexual arousal or to maintain arousal until the completion of a sexual activity. Female Sexual Interest/Arousal Disorder (FSIAD) is a diagnosis found when a subject experiences a lack of or significantly reduced sexual interest or arousal. Female hypoactive sexual desire disorder (FHSDD) is a general loss of interest in sexual activity. Other subtypes exist, for example, anorgasmia, a difficulty achieving orgasm. Currently, off-label use of testosterone has been prescribed. A therapy approved by the FDA in August 2015 is the Sprout Pharmaceuticals, Inc. product Addyi (flibanserin 100 mg), a once-daily, non-hormonal pill for the treatment of acquired, generalized hypoactive sexual desire disorder in premenopausal women. In addition, there are several drugs that were the subject of clinical trials that affect signaling in the brain. Wright, J. J. and O'Connor, K. M. *Medical Clinics of North America* 99(3): 607-628 (2015). Because both hormonal and psycho-affective drugs can be associated with serious negative side effects, alternative treatment options are desired for treating this prevalent condition.

SUMMARY

The present invention concerns a method of increasing libido and/or sexual satisfaction in a patient, the method comprising administering to a patient in need thereof a therapeutically effective amount of a population of isolated human mesenchymal stem cells. The present invention also concerns a method of treating sexual dysfunction in a patient, the method comprising administering to a patient in need thereof a therapeutically effective amount of a population of isolated human mesenchymal stem cells as either a short-term or a long-term therapy, wherein said sexual dysfunction is a sexual disorder selected from the group consisting of hypoactive sexual desire disorder, orgasmic disorder, and sexual arousal disorder.

In one aspect of the invention, the sexual dysfunction is hypoactive sexual desire disorder. In another aspect of the invention, the patient is a human. In yet another aspect of the invention, the patient is a female.

In one embodiment of the invention, the mesenchymal stem cells are bone marrow-derived mesenchymal stem cells, cord blood-derived mesenchymal stem cells, adipose tissue-derived mesenchymal stem cells, or derived from induced pluripotent stem cells (iPSCs). In one embodiment of the invention, the mesenchymal stem cells do not express STRO-1. In another embodiment of the invention, the mesenchymal stem cells do not express CD45. In another embodiment of the invention, the mesenchymal stem cells do not express fibroblast surface markers or have a fibroblast morphology. In another embodiment of the invention. the mesenchymal stem cells are not genetically manipulated. In some embodiments of the invention, the mesenchymal stem cells are allogeneic stem cells. In other embodiments of the invention, the mesenchymal stem cells are autologous stem cells. In yet other embodiments of the invention, a mixture of allogeneic and autologous mesenchymal stem cells are administered to the patient. In yet additional embodiments of the invention, a mixture of mesenchymal stem cells and non-mesenchymal stem cells are administered to the patient.

In another embodiment of the invention, the mesenchymal stem cells are administered in a single dose. In another embodiment of the invention, the mesenchymal stem cells are administered in multiple doses, e.g., two or more doses. In another embodiment of the invention, the mesenchymal stem cells are administered at least yearly.

In one embodiment, the mesenchymal stem cells are administered systemically. In one embodiment of the invention, the mesenchymal stem cells are administered by infusion or direct injection. In one embodiment of the invention, the mesenchymal stem cells are administered intravenously, intraarterially, intramuscularly, intraperitoneally, subcutaneously, intradermally, orally, transendocardially, or intranasally. In a further embodiment, the mesenchymal stem cells are administered intravenously. In a further embodiment, the mesenchymal stem cells are administered intramuscularly.

In one embodiment of the invention, the mesenchymal stem cells are administered at a dose of about $20 \times 10^6$ mesenchymal stem cells. In another embodiment of the invention, the mesenchymal stem cells are administered at a dose of about $100 \times 10^6$ mesenchymal stem cells.

In one embodiment of the invention, the mesenchymal stem cells are obtained from a human donor and wherein a step of MHC matching of the human donor to the patient is not employed prior to the administration of the mesenchymal stem cells to the patient.

In one embodiment of the invention, the treatment increases libido and/or sexual satisfaction or reduces sexual dysfunction in the patient by 25%.

BRIEF DESCRIPTION OF THE FIGURE(S)

FIG. 1. Study Flow Chart. The flow chart outlines how patients were screened and randomized for the CRATUS study.

Figure 2:
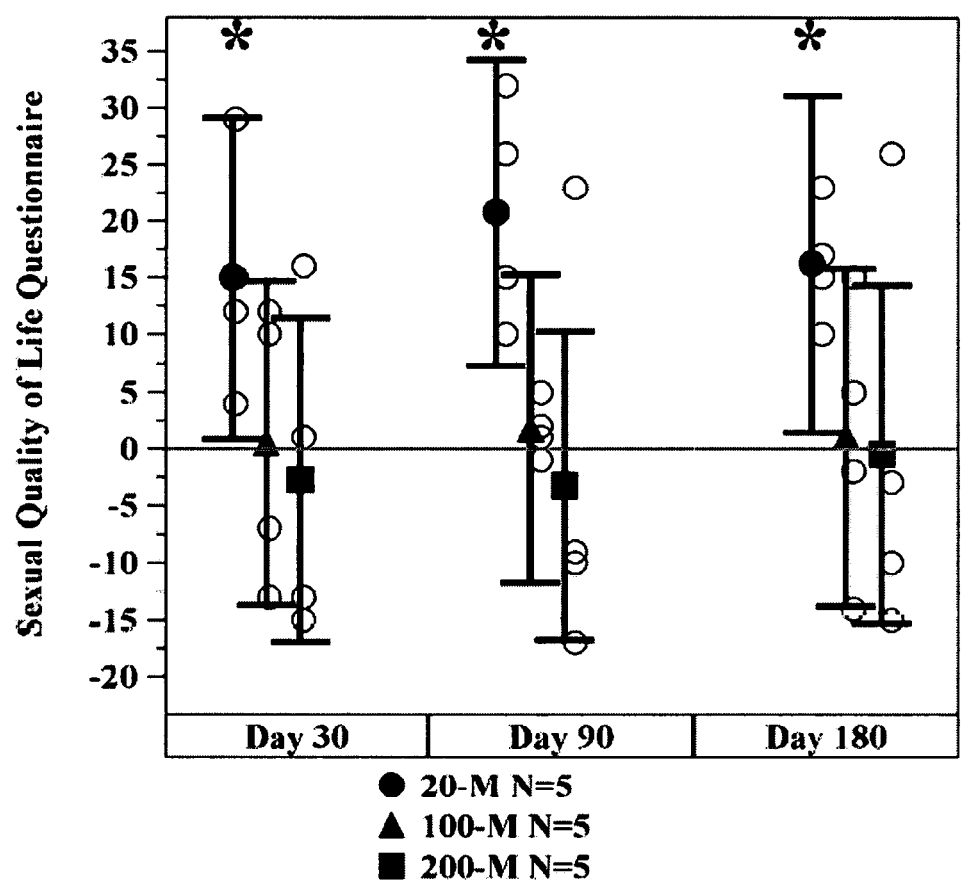

FIG. 2. Sexual quality of life-female (SQOL-F) questionnaire. There was a mean increase in the 100M-group (p=0.0348) from baseline to 6-months as compared to the 200M-group (p=0.882) and placebo (p=0.941). * indicates p≤0.05.

DETAILED DESCRIPTION

Embodiments may be practiced without the theoretical aspects presented. Moreover, the theoretical aspects are presented with the understanding that the embodiments are not bound by any theory presented.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Recitation of ranges of values herein are merely intended to serve as a shorthand method of referring individually to each separate value falling within the range, unless otherwise indicated herein, and each separate value is incorporated into the specification as if it were individually recited herein. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The term "about" or "approximately" means within an acceptable error range for the particular value as determined by one of ordinary skill in the art, which will depend in part on how the value is measured or determined, i.e., the limitations of the measurement system. For example, "about" can mean within 1 or more than 1 standard deviation, per the practice in the art. Alternatively, "about" can mean a range of +10% of the referenced value.

Dosage, Duration and Patients

"A therapeutically effective amount" means an amount that increases libido and/or sexual satisfaction or reduces sexual dysfunction in the patient. The dosage and number of doses (e.g., single or multiple dose) administered to the patient will vary depending upon a variety of factors, including the route of administration, patient conditions and characteristics (sex, age, body weight, health, size), extent of symptoms, concurrent treatments, frequency of treatment and the effect desired, and the like.

In one embodiment of the invention, the isolated population of mesenchymal stem cells is administered as a single dose. In another embodiment, the isolated population of mesenchymal stem cells is administered in multiple doses, e.g. two or more doses. In other embodiments, the isolated population of mesenchymal stem cells is administered at least yearly.

In another embodiment of the invention, the administration of the isolated population of mesenchymal stem cells is repeated, such as at least 1, 2, 3, 4, 5, 6, 7, 8, 9, 10, 11, 12, 13, 14, 15, 16, 17, or 18 months after the first administration of the isolated population of mesenchymal stem cells, or repeated at least between 2-4, 2-6, 2-8, 2-10, 3-4, 3-6, 3-8, 3-10, 4-6, 4-8, 4-10, 6-8, 6-10, 6-12, or 12-18 months after the first administration of the isolated population of mesenchymal stem cells.

In one embodiment of the invention, the isolated population of mesenchymal stem cells is administered at a dose of about $1\times10^6$, $2\times10^6$, $5\times10^6$, $10\times10^6$, $20\times10^6$, $30\times10^6$, $40\times10^6$, $50\times10^6$, $60\times10^6$, $70\times10^6$, $80\times10^6$, $90\times10^6$, $100\times10^6$, $110\times10^6$, $120\times10^6$, $130\times10^6$, $140\times10^6$, $150\times10^6$, $160\times10^6$, $170\times10^6$, $180\times10^6$, or $190\times10^6$ mesenchymal stem cells. In a further embodiment, the isolated population of mesenchymal stem cells is administered at a dose of about $20\times10^6$ mesenchymal stem cells. In a further embodiment, the isolated population of mesenchymal stem cells is administered at a dose of about $100\times10^6$ mesenchymal stem cells. In further embodiments, the isolated population of mesenchymal stem cells is administered at a dose of from about $10\text{-}100\times10^6$, $20\text{-}100\times10^6$, $50\text{-}100\times10^6$, $0.1\text{-}5\times10^6$, $0.1\text{-}10\times10^6$, $0.1\text{-}100\times10^6$, $1\text{-}50\times10^6$, $1\text{-}100\times10^6$, $0.01\text{-}10\times10^6$ or $0.01\text{-}100\times10^6$ mesenchymal stem cells.

In some embodiments, the therapeutically effective amount of the isolated population of mesenchymal stem cells is sufficient to increase the libido and/or sexual satisfaction in the patient, i.e., an increase in libido and/or sexual satisfaction by at least 5%, 10%, 15%, 20%, 25%, 30%, 35%, 40%, 45% 50%, 55%, 60%, 65%, 70%, 75%, 80%, 85%, 90%, 95%, 100%, 200%, 300%, 400%, or 500%.

In some embodiments, the therapeutically effective amount of the isolated population of mesenchymal stem cells is sufficient to reduce sexual dysfunction in the patient, i.e., a reduction in sexual dysfunction by at least by 5%, 10%, 15%, 20%, 25%, 30%, 35%, 40%, 45% 50%, 55%, 60%, 65%, 70%, 75%, 80%, 85%, 90%, 95%, or 100%.

"Administering" a composition may be accomplished by any technique known in the art, including, but not limited to, oral administration, injection, infusion, parenteral, intravenous, mucosal, sublingual, intramuscular, intradermal, intranasal, intraperitoneal, intraarterial, subcutaneous absorption or by any method in combination with other known techniques. In one embodiment of the invention, the isolated population of mesenchymal stem cells is administered systemically. In another embodiment of the invention, the isolated population of mesenchymal stem cells is administered by infusion or direct injection. In one embodiment of the invention, the isolated population of mesenchymal stem cells is administered intramuscularly, intravenously, intraarterially, intraperitoneally, subcutaneously, intradermally, orally, transendocardially, or intranasally. In a further embodiment, the isolated population of mesenchymal stem cells is administered intramuscularly. In a further embodiment, the isolated population of mesenchymal stem cells is administered intravenously.

The term "patient" as used herein includes, but is not limited to, humans and non-human vertebrates such as wild, domestic, and farm animals. In some embodiments, the term refers to humans, such as elderly humans ≥65 years of age, or elderly humans 60-95 years of age. In some embodiments, the human patient is a female.

The term "allogeneic" refers to a cell that is of the same animal species but genetically different in one or more genetic loci as the animal that becomes the "recipient host." This usually applies to cells transplanted from one animal to another non-identical animal of the same species.

The term "autologous" means derived from the same organism.

As used herein, the phrase "in need thereof" means that the patient has been identified as having a need for the particular method or treatment. In some embodiments, the identification can be by any means of diagnosis. In any of the methods and treatments described herein, the patient can be in need thereof.

Cells are referred to herein as being positive or negative for certain cellular or protein markers. For example, a cell can be negative for CD45, which can also be referred to as CD45−. The superscript notation "−" refers to a cell that is negative for the marker linked to the superscript. In contrast, a marker with the "+" refers to a cell that is positive for that marker. For example, a cell that is referenced as "CD8+" is positive for CD8. A "+" can also be used to reference the marker as positive. A "−" can also be used to reference the marker as negative.

As used herein, the term "stem cell" refers to a cell from the embryo, fetus, or adult that has, under certain conditions, the ability to reproduce itself for long periods or, in the case of adult stem cells, throughout the life of the organism. It also can give rise to specialized cells that make up the tissues and organs of the body. In one embodiment of the invention, the stem cells are adult stem cells, such as, but not limited to, mesenchymal stem cells, hematopoietic stem cells, neural stem cells, epithelial stem cells, and skin stem cells. In another embodiment of the invention, the stem cells are embryonic stem cells.

Mesenchymal stem cells are the formative pluripotent blast cells found, inter alia, in bone marrow, blood, dermis, and periosteum that are capable of differentiating into any kind of the specific types of mesenchymal or connective tissues (i.e., the tissues of the body that support the specialized elements; particularly adipose, osseous, cartilaginous, elastic, and fibrous connective tissues) depending upon various influences from bioactive factors, such as cytokines.

Certain methods of isolating and/or purifying mesenchymal stem cells have been described herein and/or are known in the art. In some embodiments, mesenchymal stem cells are isolated from bone marrow of adult humans. In some embodiments, the cells are passed through a density gradient to eliminate undesired cell types. The cells can be plated and cultured in appropriate media. In some embodiments, the cells are cultured for at least one day or about three to about seven days, and may include removal of non-adherent cells. The adherent cells can then be plated and expanded.

Other methods for isolating and culturing stem cells are also known in the art. Placenta is an excellent readily available source for mesenchymal stem cells. Moreover, mesenchymal stem cells can be derivable from adipose tissue and bone marrow stromal cells are speculated to be present in other tissues. While there are dramatic qualitative and quantitative differences in the organs from which adult stem cells can be derived, the initial differences between the cells may be relatively superficial and balanced by the similar range of plasticity they exhibit.

Homogeneous human mesenchymal stem cell compositions are provided which serve as the progenitors for all mesenchymal cell lineages. Mesenchymal stem cells are identified by specific cell surface markers, which may be identified with unique monoclonal antibodies. The homogeneous mesenchymal stem cell compositions are obtained by positive selection of adherent marrow or periosteal cells that are free of markers associated with either hematopoietic or differentiated mesenchymal cells. These isolated mesenchymal cell populations display epitopic characteristics associated with only mesenchymal stem cells, have the ability to regenerate in culture without differentiating, and have the ability to differentiate into specific mesenchymal lineages when either induced in vitro or placed in vivo at a site of inflammation.

In order to obtain the human mesenchymal stem cells for the compositions, methods, and kits disclosed herein, pluripotent mesenchymal stem cells are separated from other cells in the bone marrow or other mesenchymal stem cell source. Bone marrow cells may be obtained from iliac crest, femora, tibiae, spine, rib, or other medullary spaces. Other locations from which human mesenchymal stem cells can be obtained include embryonic yolk sac, placenta, umbilical cord, fetal and adolescent skin, and blood. In some embodiments, the mesenchymal stem cells are obtained from cord blood, adipose tissue, or induced pluripotent stem cells (iPSCs).

In some embodiments, the human mesenchymal stem cells of the invention are identified by the absence of certain markers. For example, human mesenchymal stem cells useful in the invention include those that are negative for STRO-1 and/or negative for CD45. Similarly, human mesenchymal stem cells useful in the invention include those that do not express fibroblast surface markers or have a fibroblast morphology.

Increasing Libido and/or Sexual Satisfaction or Reducing Sexual Dysfunction

As discussed above, the present invention relates to methods to treat or reduce sexual dysfunction and related disorders pertaining to sexual activity and sexual satisfaction, and methods to enhance or increase sexual satisfaction, in some embodiments female sexual satisfaction. The present disclosure also relates to methods to treat women to reduce time to orgasm, to increase intensity of orgasm, and to improve sexual quality of life.

As used herein, the terms "female sexual dysfunction" or "FSD" refer generally to the impairment of the sexual function in a female. Sexual dysfunction in females includes inhibited orgasm. Female sexual dysfunction includes, but is not limited to, a number of categories of diseases, conditions and disorders including female hypoactive sexual desire disorder (FHSDD or HSDD, used interchangeably herein), female orgasmic disorder (FOD), sexual anhedonia, female sexual interest/arousal disorder (FSIAD), and female sexual arousal disorder (FSAD). Hypoactive sexual desire disorder includes a disorder in which sexual fantasies and desire for sexual activity are persistently or recurrently diminished or absent, causing marked distress or interpersonal difficulties. Sexual anhedonia includes decreased or absent pleasure in sexual activity. Sexual arousal disorder can be caused by reduced estrogen, illness, or treatment with diuretics, antihistamines, antidepressants, or antihypertensive agents. The woman can experience mild, moderate, or severe FSD.

In one embodiment, FSD, FSAD, FOD and FHSDD are as defined in the Diagnostic and Statistical Manual of Mental Disorders (DSM), 4th edition, the contents of which definitions are incorporated herein by reference. In another embodiment, the disorder is female sexual interest/arousal disorder (FSIAD), which encompasses FSAD and FHSDD. FOD and FSIAD are defined in the Diagnostic and Statistical Manual of Mental Disorders (DSM), 5th edition, the contents of which definitions are hereby incorporated herein by reference. The diagnostic criteria for FSIAD include a lack of, or significantly reduced, sexual interest/arousal, as manifested by at least three of the following: (1) absent/reduced interest in sexual activity; (2) absent/reduced sexual/erotic thoughts or fantasies; (3) no/reduced initiation of sexual activity, and typically unreceptive to a partner's attempts to initiate; (4) absent/reduced sexual excitement/pleasure during sexual activity in almost all or all sexual encounters; (5) absent/reduced sexual interest/arousal in response to any internal or external sexual/erotic cues; and (6) absent/reduced genital or nongenital sensations during sexual activity in almost all or all sexual encounters. In FSIAD, these symptoms have persisted for a minimum duration of approximately six months and cause the patient significant distress. The diagnostic criteria for FOD are as follows:

A. Presence of either of the following symptoms and experienced on almost all or all (approximately 75%-100%) occasions of sexual activity (in identified situational contexts or, if generalized, in all contexts): (1). Marked delay in, marked infrequency of, or absence of orgasm. (2). Markedly reduced intensity of orgasmic sensations.

B. The symptoms in Criterion A have persisted for a minimum duration of approximately 6 months.

C. The symptoms in Criterion A cause clinically significant distress in the individual.

D. The sexual dysfunction is not better explained by a nonsexual mental disorder or as a consequence of severe relationship distress (e.g., partner violence) or other significant stressors and is not attributable to the effects of a substance/medication or another medical condition.

The diagnosis of FOD also asks the clinician to specify, whether (1) Lifelong: The disturbance has been present since the individual became sexually active or (2) Acquired: The disturbance began after a period of relatively normal sexual function. Also, the clinician is to specify whether (1) Generalized: Not limited to certain types of stimulation, situations, or partners or (2) Situational: Only occurs with certain types of stimulation, situations, or partners. The clinician is to specify if the patient never experienced an orgasm under any situation. The clinician is also to specify the current severity: (1) Mild: Evidence of mild distress over the symptoms in Criterion A, (2) Moderate: Evidence of moderate distress over the symptoms in Criterion A, (3) Severe: Evidence of severe or extreme distress over the symptoms in Criterion A. As reported in the Diagnostic and Statistical Manual of Mental Disorders (DSM), 5th edition, page 431, selective serotonin reuptake inhibitors (SSRIs) are known to delay or inhibit orgasm in women.

According to certain of the methods disclosed herein, to treat female sexual dysfunction disorder(s) or to enhance female sexual satisfaction, a therapeutically effective amount of an isolated population of mesenchymal stem cells is administered to the patient in need thereof. In one aspect of the invention, there is a method of treating FSD. FSIAD, FSAD, FSOD, or FHSDD, comprising administering to a patient in need of such treatment a therapeutically effective amount of an isolated population of mesenchymal stem cells.

In other embodiments, the invention is directed to methods of increasing female sexual satisfaction, increasing duration of orgasm, reducing time to orgasm, increasing intensity of orgasm and/or increasing oxytocin release related to sexual activity by administering a therapeutically effective amount of an isolated population of mesenchymal stem cells. In other embodiments, the invention is directed to methods of increasing female sexual self-esteem and/or increasing a female patient's self-perception of femininity by administering a therapeutically effective amount of an isolated population of mesenchymal stem cells.

Enhancement of female sexual satisfaction, female sexual self-esteem, female self-esteem, and female self-perception of femininity can be measured by patient questionnaires to determine if the patient's quality of life, particularly in sexual matters, is enhanced by the present therapeutic methods. Enhancement can also be determined by a change from baseline in the number of satisfying sexual events (SSE), a change from baseline in the level of sexual interest or desire, a change from baseline in the level of sexual arousal, or a change from baseline in the level of distress from sexual activities. Baseline may be defined as a four-week no-treatment phase or a four-week placebo run-in phase. Changes from baseline typically refer to the treatment responses obtained during the last four weeks of a double-blinded treatment period relative to baseline. The time period used for assessing baseline (e.g., four weeks) should be the same as the time period used for assessing treatment responses (e.g., four weeks at the end of the treatment period). Enhancement of self-esteem or female sexual self-esteem may be measured by any one of the questionnaires and scales available in the art such as, without limitation, those disclosed in Heatherton. T. F. & Polivy, J. J. Personality and Social Psychology. 60:895-910 (1991): and Rosenberg self-esteem scale published in Rosenberg, M. "Society and the adolescent self-image," Princeton University Press, Princeton, New Jersey (1965). In one embodiment, the questionnaire is completed by the female patient at a time prior to administration of the therapeutically effective amount of an isolated population of mesenchymal stem cells and prior to one or more episodes of sexual intimacy, and then the questionnaire is completed again by the same patient after the administration of the therapeutically effective amount of an isolated population of mesenchymal stem cells and the occurrence of one or more episodes of sexual intimacy.

The patients to be treated with the present invention include humans, and in certain embodiments are pre-, per- and post-menopausal women. In one embodiment, the woman is concomitantly on hormone replacement therapy. In another embodiment she is not on concomitant hormone replacement therapy.

In another embodiment, the patients to be treated is a mammal, such as non-human primates (particularly higher primates), sheep, dog, rodent (e.g., mouse or rat), guinea pig, goat, pig, cat, rabbits, cow, and panda. Treatment in non-human mammals may be desirable to accelerate conception during mating.

In one embodiment, the patient to be treated is a human or animal concomitantly taking one or more SSRI or anti-depressants, such as antidepressants used in the treatment of major depressive disorder and anxiety disorders. SSRIs may cause a variety of sexual dysfunction, such as anorgasmia, erectile dysfunction, diminished libido, genital numbness, and sexual anhedonia (pleasureless orgasm). To minimize or reduce these side effects, the mesenchymal stem cells of the present disclosure according to any of the methods of administration disclosed herein may also be administered to the patient concomitantly with the SSRI therapy. By "concomitantly" is meant herein to be administered in the same day, week or month, not necessarily at the same time of day, however. SSRIs include the following: citalopram, fluvoxamine, escitalopram, paroxetine, sertraline, fluoxetine, and dapoxetine. The compositions and methods of the present disclosure may also be used with a patient who concomitantly is taking tricyclic antidepressants or serotonin-noradrenaline reuptake inhibitors (SNRIs). Examples of SNRIs include the following: venlafaxine: desvenlafaxine, duloxetine, milnacipran, levomilnacipran, and sibutramine.

As used herein, the terms "treat," "treatment," or "treating" refer to therapeutic treatments, wherein the object is to reverse, alleviate, ameliorate, inhibit, slow down or stop the progression or severity of a disease or condition, e.g. FSD. The term "treating" includes reducing or alleviating at least one adverse effect or symptom of a disease or condition, e.g., FSD. Treatment is generally "effective" if one or more symptoms are reduced. That is, "treatment" includes the improvement of symptoms. Beneficial or desired clinical results include, but are not limited to, alleviation of one or more symptom(s) and diminishment of extent of disease.

For example, treatment of FSD is considered effective if the number of satisfying sexual events (SSE) is increased from baseline in a sampled time (e.g., 4 weeks), in a significant manner. Other established metrics to determine treatment efficacy for FSD include, for example, FSFI (female sexual function index), SAL (Sexual Activity Log), SAR (Sexual Activity Record), FSDS (Female Sexual Distress Scale), and the FSDS-R (Female Sexual Distress Scale Revised).

In one embodiment, a therapeutic effect is seen when the difference from baseline is a "minimally important difference" or "MIN" defined in: DeRogatis. L. et. al., *Journal of Sexual Medicine*. 6:175-183 (2009), the contents of which are incorporated herein by reference. Such a change may be small but meaningful to patients.

Efficacy of treatment for FSD and enhancement of sexual satisfaction can be determined by monitoring the number of satisfying sexual events (SSE) in a given experimental period. For example, a questionnaire may be administered by a clinician asking the number of SSEs a patient has experienced in a given four-week period. A treatment can thus be administered for another four-week period and the questionnaire can be re-assessed at the end of the treatment. An increase in SSE from baseline can then be evaluated, for example, in a statistically significantly large cohort. As but one example, an average increase from 6 to 6.7 SSEs would show efficacy of a treatment. Similarly, secondary endpoints could include questionnaires assessing sexual satisfaction, e.g., change from baseline to end-of-study in arousal domain score, female sexual function index, satisfaction with arousal, desire domain from female sexual function index, satisfaction with desire, quality of relationship with partner, and a female sexual distress scale. Other established metrics to determine treatment efficacy for FSD can also be used, and they include, for example, FSFI (female sexual function index), SAL (Sexual Activity Log), SAR (Sexual Activity Record), FSDS (Female Sexual Distress Scale), and the FSDS-R (Female Sexual Distress Scale Revised).

Other parameters to measure or quantify sexual arousal in females include arousal domain score from female sexual function index, satisfaction with arousal, desire domain from female sexual function index, satisfaction with desire as measured, quality of relationship with partner, and change in hormone levels such as oxytocin. A treatment is considered effective if any one or a combination of these parameters is increased as compared to a reference level that is measured in the absence of the treatment.

Compositions

Compositions for use in the invention may be formulated using any suitable method. Formulation of cells with standard pharmaceutically acceptable carriers and/or excipients may be carried out using routine methods in the pharmaceutical art. The exact nature of a formulation will depend upon several factors including the cells to be administered and the desired route of administration. Suitable types of formulation are known in the art, many of which are fully described in Remington's Pharmaceutical Sciences, 19th Edition, Mack Publishing Company, Eastern Pennsylvania, USA.

Compositions may be prepared together with a physiologically acceptable carrier or diluent. Typically, such compositions are prepared as liquid suspensions of cells. The cells may be mixed with an excipient which is pharmaceutically acceptable and compatible with the active ingredient. Suitable excipients include, for example, water, saline, dextrose, glycerol, of the like and combinations thereof.

In addition, if desired, the pharmaceutical compositions of the invention may contain minor amounts of auxiliary substances such as wetting or emulsifying agents, pH buffering agents, and/or adjuvants which enhance effectiveness. In one embodiment of the invention, the adjuvant comprises human serum albumin (HSA).

One suitable carrier or diluent is PlasmaLyte A™. This is a sterile, nonpyrogenic isotonic solution for intravenous administration. Each 100 mL contains 526 mg of Sodium Chloride, USP (NaCl); 502 mg of Sodium Gluconate ($C_6H_{11}NaO_7$): 368 mg of Sodium Acetate Trihydrate, USP ($C_2H_3NaO_2 3H_2O$); 37 mg of Potassium Chloride, USP (KCl); and 30 mg of Magnesium Chloride, USP ($MgCl_2 6H_2O$). It contains no antimicrobial agents. The pH is adjusted with sodium hydroxide. The pH is 7.4 (6.5 to 8.0).

In one embodiment of the invention the mesenchymal stem cells are not genetically manipulated. In another embodiment of the invention, the mesenchymal stem cells are cryopreserved. For example, the mesenchymal stem cells can be suspended in cryoprotectant consisting of Hespan® (6% hetastarch in 0.9% sodium chloride) supplemented with 2% HSA and 5% DMSO and then aliquoted into cryopreservation containers for placement in vapor phase nitrogen freezers. In another embodiment, the mesenchymal stem cells may be provided in PlasmaLyte A supplemented with 1% HSA.

EXAMPLES

The following example illustrates some embodiments and aspects of the invention. It will be apparent to those skilled in the relevant art that various modifications, additions, substitutions, and the like can be performed without altering the spirit or scope of the invention, and such modifications and variations are encompassed within the scope of the invention as defined in the claims which follow. The technology disclosed herein is further illustrated by the following examples which in no way should be construed as being further limiting.

The AllogeneiC Human Mesenchymal Stem Cells in Patient with Aging FRAilTy via IntravenoUS Delivery (CRATUS) study is a phase II, randomized, double-blinded, placebo-controlled study of allogeneic human mesenchymal stem cells (allo-hMSCs) (100 or 200-million cell dose) versus placebo delivered intravenously (IV) in frail individuals to test the safety and efficacy of allo-hMSCs in reducing markers of inflammation and improving markers of physical and mental functioning and quality of life. Screening and patient randomization are outlined in FIG. 1.

Patient Population and Timeline

Patient eligibility required diagnosis or symptomatology of frailty, defined by a frailty score between 4-7 as denoted by the Canadian Study on Health and Aging. Koller, K. et al., *Cleve Clin. J. Med.* 80(3): 168-174 (2013); McElhaney, J. E. et al., *Curr. Opin. Immunol.* 21(4):418-424 (2009). All patients were ≥60 and ≤95 of age at the time of consent. Table 1 shows the baseline characteristics of the enrolled patients. Sixty percent of the patients were white males and the mean age was 75.5±7.3 years.

TABLE 1

| | | Treatment Group | | | |
|---|---|---|---|---|---|
| | | Allo-100M (N = 10) N | Allo-200M (N = 10) N | Placebo (N = 10) N | Total (N = 30) N |
| | Characteristics | (%) | (%) | (%) | (%) |
| Gender | Male | 6 (60%) | 6 (60%) | 6 (60%) | 18 (60%) |
| | Female | 4 (40%) | 4 (40%) | 4 (40%) | 12 (40%) |
| Ethnicity | Hispanic or Latino | 1 (10%) | 1 (10%) | 2 (20%) | 4 (13.3%) |
| | Not Hispanic or Latino | 9 (90%) | 9 (90%) | 8 (80%) | 26 (86.7%) |
| Race | American Indian/ Alaskan Native | 0 (0%) | 1 (10%) | 0 (0%) | 1 (3.3%) |
| | White American | 10 (100%) | 9 (90%) | 10 (100%) | 29 (96.7%) |
| Age at infusion (years) | | 75.0 ± 7.4 | 76.3 ± 8.4 | 75.3 ± 6.8 | 75.5 ± 7.3 |
| Infusion Status | Yes | 10 (100%) | 10 (100%) | 10 (100%) | 30 (100%) |
| | No | 0 (0%) | 0 (0%) | 0 (0%) | 0 (0%) |
| | Unknown | 0 (0%) | 0 (0%) | 0 (0%) | 0 (0%) |
| Canadian Clinical Frailty Score | 4 | 5 (50%) | 7 (70%) | 5 (50%) | 17 (56.7%) |
| | 5 | 3 (30%) | 1 (10%) | 5 (50%) | 9 (30%) |
| | 6 | 2 (20%) | 2 (20%) | 0 (0%) | 4 (13.3%) |
| | 7 | 0 (0%) | 0 (0%) | 0 (0%) | 0 (0%) |
| Mini Mental State Examination | | 29.3 ± 0.8 | 28.5 ± 1.1 | 29.5 ± 1.0 | 29.1 ± 1.0 |
| Hemoglobin Level (g/dL) | | 14.1 ± 1.2 | 13.5 ± 1.3 | 14.3 ± 1.2 | 14.0 ± 1.3 |
| WBC Count (cells/mm$^3$) | | 7160 ± 2438 | 6600 ± 1304 | 7070 ± 2215 | 6943 ± 1989 |
| Platelet Count (cells/mm$^3$) | | 207,000 ± 64,389 | 194,500 ± 37,936 | 194,500 ± 57880 | 198,667 ± 52999 |
| AST (U/L) | | 24.5 ± 7.6 | 20.7 ±3.6 | 29.3 ± 11.1 | 24.8 ± 8.5 |
| ALT (U/L) | | 23.0 ± 16.2 | 16.5 ± 6.0 | 31.9 ± 15.6 | 23.8 ± 14.5 |
| Six Minute Walk Test (m) | | 345.9 ± 103.4 | 390.6 ± 148.9 | 385.8 ± 83.1 | 374.1 ± 112.9 |
| FEV1 (L) | | 2.5 ± 0.7 | 2.3 ± 0.9 | 2.3 ± 0.5 | 2.4 ± 0.7 |
| FEV1 (percent predicted) | | 90.6 ± 10.4 | 86.9 ± 25.4 | 87.9 ± 15.2 | 88.5 ± 17.6 |
| Tumor Necrosis Factor-α (pg/mL) | | 3.2 (2.8, 3.8) | 3.2 (2.6, 3.4) | 2.4 (1.1, 3.1) | 3.1 (2.1, 3.4) |

Values are Mean ± Std. Dev., N (%), or Median (interquartile range [IQR]). FEV1 (Liters), Forced Expiratory Volume in one second. Hemoglobin (grams/deciliter). WBC (cells/millimeters$^3$), white blood cells. AST (U/L), Aspartate Aminotransferase (units/liter). ALT, Alanine Aminotransferase. 6 minute walk test distance (m, meters). Tumor Necrosis Factor-α (pg/mL, picogram/milliliter).

Study Endpoints

The primary endpoint was the safety of allo-hMSCs at 1-month, assessed by treatment emergent-serious adverse events (TE-SAE). TE-SAE was defined by the following: death, nonfatal pulmonary embolism, stroke, hospitalization for worsening dyspnea, and clinically significant laboratory abnormalities.

The secondary endpoints assessed the efficacy of the therapy. Efficacy was demonstrated by differences in the rate of change of frailty markers as defined by: reduced activity (Community Healthy Activities Model Program for Seniors (CHAMPS) questionnaire), slowing of mobility (6 minute walk test (6MWT), 4-meter gait speed test (4MGST), and the short physical performance battery (SPPB) score, comprised of balance tests, gait speed tests, and chair stand tests), weight loss, diminished hand grip strength (dynamometry), exhaustion multidimensional fatigue inventory (MFI), quality of life assessments (Sexual Quality of Life-Female (SQOL-F) and International Index of Erectile Dysfunction (IIEF) Questionnaires), dobutamine-induced ejection fraction (EF) via echocardiography, C-reactive protein (CRP), IL-6, D-dimer, complete blood cell count (CBC) with differential, and TNF-α.

Statistical Analysis

No formal statistical justification was performed to determine sample size for this study. Sample size was determined to be appropriate for an early phase study to assess safety in this population. Due to the early phase nature of this study, no adjustments were made for multiple analyses.

Results

Safety

No TE-SAEs occurred in any of the three groups in the first 30 days. Similarly, there were no cumulative treatment-related SAEs in either group throughout the duration of the study. None of the patients showed any signs of adverse cardiopulmonary reaction following the intravenous infusion. There were no clinically significant changes in basic hematologic and chemistry laboratory tests throughout the duration of the study.

Long-Term Adverse Events

One patient in the 200M-group died of an unrelated event prior to the 12-month follow up. Additionally, one patient in the placebo had an unrelated stroke 307 days post-infusion. The proportion of patients with adverse events at 12 months did not differ between groups at the 6- and 12-month time points (p=0.300 and p=0.141, respectively).

Rehospitalization

There were 5 patients who required hospitalization within the 12-month follow-up. Three of the hospitalizations were reported in two patients in the 100M-group, all of which were moderate in severity; however, none of the hospitalizations were secondary to the procedure. No patients in the 200M-group were hospitalized. The remaining 3 patients belonged to the placebo group, 1 with a hospitalization that was moderate in severity, and 2 with at least one severe hospitalization. None of the hospitalizations were related to the procedure.

Sexual Quality of Life

Unexpectedly, among female patients, the SQOL-F exhibited a remarkable increase in the 100M-group at 6-months (59.8±15.3 to 76.0±12.9, p=0.035), but no changes were observed in the 200Mgroup (p=0.882) or placebo (p=0.941; FIG. 2). Conversely, there were no differences among male participants in the IIEF from baseline to 6-months (p=0.666). This is a particularly meaningful marker of improved quality of life, as loss of libido in post-menopausal women is intrinsically linked to hypoactive sexual desire disorder (HSDD), a disorder marked by clinically significant personal distress.

What is claimed is:

1. A method of increasing libido and/or sexual satisfaction in a female human patient in need thereof, comprising administering a therapeutically effective amount of a population of isolated allogeneic bone marrow-derived human mesenchymal stem cells, wherein the patient is a human female patient of ≥60 and ≤90 years of age, wherein the composition is administered at a dose of about $10 \times 10^6$-$100 \times 10^6$ mesenchymal stem cells, and wherein the libido and/or sexual satisfaction is increased from a SQOL-F score of about 60 to about 76 over a 6 month period.

2. The method of claim 1, wherein the mesenchymal stem cells do not express CD45.

3. The method of claim 1, wherein the mesenchymal stem cells are administered in a single dose.

4. The method of claim 1, wherein the mesenchymal stem cells are administered in two or more doses.

5. The method of claim 1, wherein the mesenchymal stem cells are administered every 6 months.

6. The method of claim 1, wherein the mesenchymal stem cells are administered at least yearly.

7. The method of claim 1, wherein the mesenchymal stem cells are administered systemically.

8. The method of claim 1, wherein the mesenchymal stem cells are administered by infusion or direct injection.

9. The method of claim 1, wherein the mesenchymal stem cells are administered intravenously, intraarterially, or intraperitoneally.

10. The method of claim 1, wherein the mesenchymal stem cells are administered at a dose of about $20 \times 10^6$ mesenchymal stem cells.

11. The method of claim 1, wherein the mesenchymal stem cells are administered at a dose of about $100 \times 10^6$ mesenchymal stem cells.

12. The method of claim 1, wherein the mesenchymal stem cells are obtained from a human donor and wherein a step of MHC matching of the human donor to the patient is not employed prior to the administration of the mesenchymal stem cells to the patient.

13. The method of claim 1, wherein treatment increases libido and/or sexual satisfaction or reduces sexual dysfunction in the patient by at least 25%.

* * * * *